L. G. E. BUEHLER.
FRONT TRUCK FOR TRACTORS AND SIMILAR VEHICLES.
APPLICATION FILED JULY 22, 1918.
1,330,056.
Patented Feb. 10, 1920.
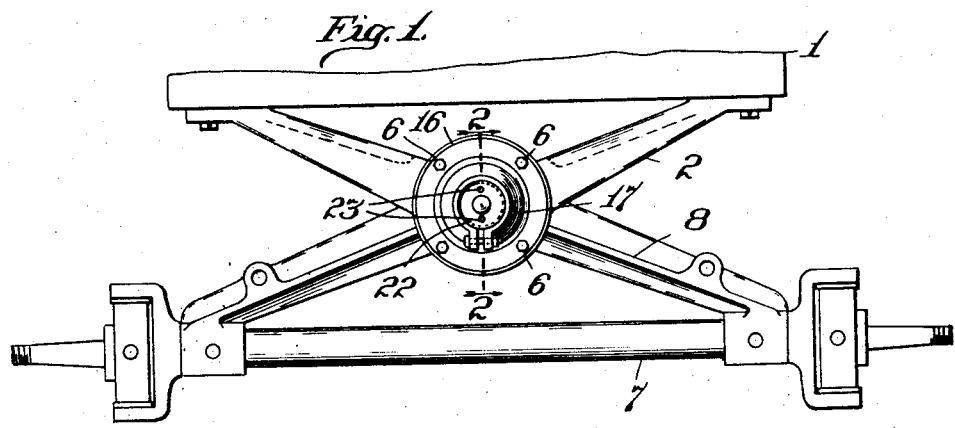
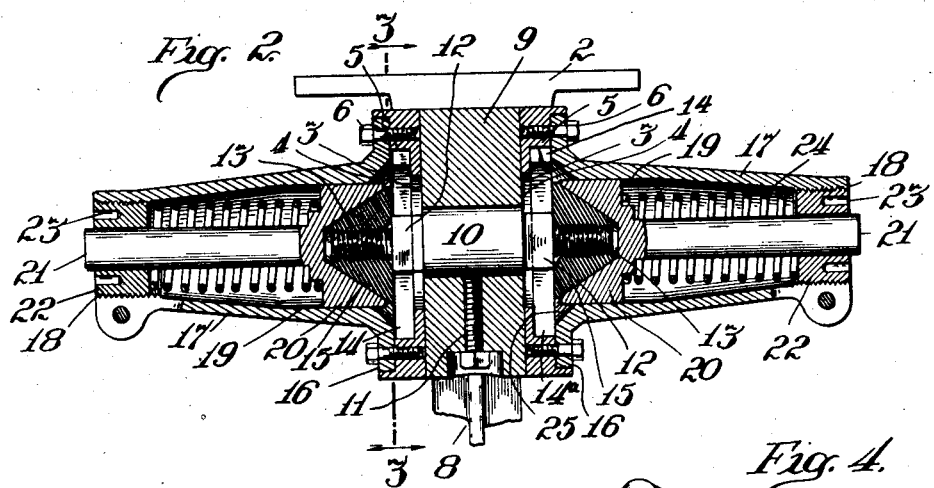
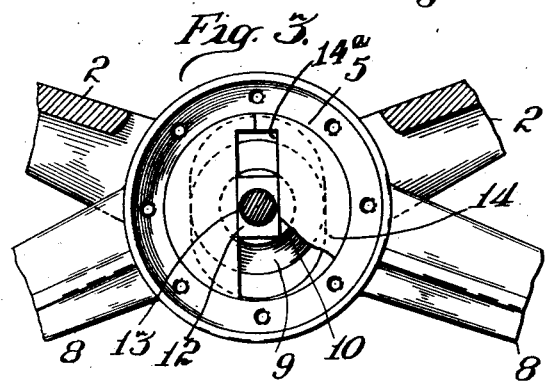
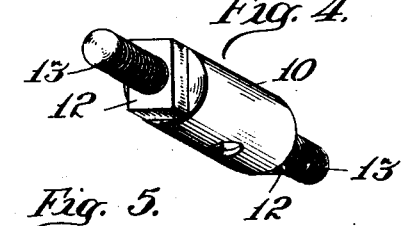
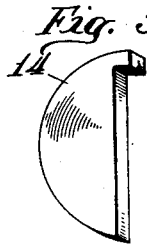
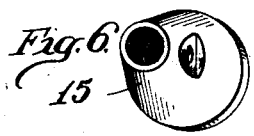
Witnesses
Inventor
Louis G. E. Buehler
Attorney

UNITED STATES PATENT OFFICE.

LOUIS G. E. BUEHLER, OF CHICAGO, ILLINOIS.

FRONT TRUCK FOR TRACTORS AND SIMILAR VEHICLES.

1,330,056.　　　　　Specification of Letters Patent.　　Patented Feb. 10, 1920.

Application filed July 22, 1918. Serial No. 246,166.

*To all whom it may concern:*

Be it known that I, LOUIS G. E. BUEHLER, citizen of the United States, residing at Chicago, in the county of Cook and State of Illinois, have invented certain new and useful Improvements in Front Trucks for Tractors and Similar Vehicles, and I do hereby declare the following to be a full, clear, and exact description of the invention, such as will enable others skilled in the art to which it appertains to make and use the same.

This invention has for its object to provide a front truck for tractors and the like, which provides a yielding or spring action and frictional shock absorption between the front axle and the vehicle body, and further provides a shiftable pivotal connection between said parts on a horizontal axis which will permit the front axle to swing independently of the vehicle body as one front wheel passes over an obstruction, or into a hollow without thereby tipping the vehicle body, thus permitting such body to remain in its normal position as determined by the position of the rear wheels of the vehicle. The device also permits the vehicle body to swing relatively to the front truck or axle as the rear wheels pass over uneven ground and tilt the body.

The invention has for its further object to provide a yielding support for the front axle of the vehicle which may be adjusted in tension in order to provide any desired degree of resistance to a relative approaching movement of the body and axle.

A further object of the invention is to provide a spring pressed means for resisting relative approaching movement of the vehicle body and front axle in which the direction of movement is always in a predetermined plane relatively to the front axle regardless of the relative inclination of the axle and body at the time of the relative approaching movement.

The invention consists in the features of construction and combinations of parts hereinafter fully described and claimed.

In the accompanying drawings, illustrating a suitable embodiment of the invention:

Figure 1 is a view in front elevation of a front truck for tractors and the like, constructed in accordance with the invention.

Fig. 2 is a vertical longitudinal section of the same on the line 2—2 of Fig. 1 on an enlarged scale.

Fig. 3 is a fragmentary detail vertical section on the line 3—3 of Fig. 2.

Fig. 4 is a detail perspective view of what may be termed the center pin of the device about which the front axle turns as it becomes tilted relatively to the body.

Fig. 5 is a detail perspective view of a guide element employed.

Fig. 6 is a detail perspective view of a cone employed.

In tractors and similar vehicles frequently required to pass over very rough ground the body and front axle are generally so connected as to prevent any tilting of the axle relatively to the body so that if one of the front wheels passes over an obstruction the tendency is to tilt the entire body and cause very severe strains on the frame, motor and running gear owing to the fact that the body is incapable of tilting relatively to the rear axle, as well as the front axle. These strains frequently cause breakages and obviously rack the vehicle unduly.

My present invention is designed to overcome this objection, and consists in providing a front truck including a body bolster consisting of the beam or frame member 1 to the lower face of which a brace member 2 is rigidly secured. The latter has two inclined arms which are channeled, and are integral with the middle or hollow hub portion, consisting of two parallel axially alined circular plates 3 each having a central circular opening 4 and an annular outwardly projecting flange 5, the portions of said plates between the central openings and annular flanges having threaded openings to receive the screws 6.

The front axle 7 is secured at opposite ends in the bifurcated end portions of the arms 8 of a yoke having a middle cylindrical portion 9 integral with the said arms, and which is adapted to be received between the plates 3. The said portion 9 has a central opening in which a shaft section 10 is mounted, the latter being held against rotation therein by means of the set screw 11. The said shaft section is provided at opposite ends with rectangular projections 12 which extend from the end faces thereof which are flush with the side faces of the member 9. Extending centrally from the projections 12 are threaded projections 13.

Mounted in the central openings in the plates 3 are circular plates 14, each provided with a diametric slot 14ª extending from the lower end thereof to a point contiguous to the opposite edge of the same, the side walls of said slot engaging the side faces of the projections 12 of the section 10 and serving to cause the latter to move always diametrically of the said plates 3. The plates 14 may be made of two equal sections as shown, or may consist each of a single piece, if desired.

Mounted upon the threaded elements 13 are frustums of cones 15, the length of the projections 12 being such as to prevent the bases of the cones from bearing upon the plates 14 and thereby preventing a free sliding movement of the member 9 relatively to and between the plates 3.

Secured to the outer faces of the members 3 are the annular flanges 16 of sleeves 17 each of which is slightly tapered toward its outer end and is provided at its outer end with a cylindrical internally threaded portion 18. At their inner ends the sleeves 17 are provided with cylindrical portions 19 in which plungers 20 are reciprocably movable. Each of the latter is provided with a recess corresponding in shape and size with the cone 15 and receiving the latter. Said plungers 20 are provided with integral central shanks 21 which pass through the externally threaded collars or nuts 22 mounted in the threaded outer end portions of the sleeves 17 and which are adapted to be turned by means of a spanner wrench entering the recesses 23 therein. Interposed between the nuts or collars 22 and the opposed faces of the plungers 20 are helical compression springs 24, the pressure of which may be adjusted by means of the nuts or collars 22 in an obvious manner. Each of the sleeves 17 has its mouth portion tapered at top and bottom, as shown in Fig. 2 to provide recesses 25 between the flanges 16 and cylindrical portions 19 to receive the cones 15 in the event that the relative sliding movement of the body-bolster and yoke shall approach its limit.

In operation it will be obvious that the pressure exerted by the springs 24 upon the plungers 20 will hold the cones 15 and parts associated therewith in axial alinement with the sleeves 17 which are concentric with the plates 3. The axle 7 and yoke connected therewith are free to turn on this axis as a pivot and under the influence of shock, such as is caused by one of the front wheels passing over an obstruction, a relative movement of the yoke 8 and brace 2 takes place, thereby causing the plungers 20 to be moved outwardly against the action of the springs 24.

This relative vertical movement of the axes of the two parts must necessarily always be in the diametric plane of the axis of the plates 3 as determined by the plates 14 and the rigidity of the rectangular projections 12 with the member 9 of the yoke, and said movement is further always in a plane perpendicular to and intersecting the front axle midway between its ends, the purpose of the plates 14 being to prevent a lateral shifting of the axle relatively to the body in a direction parallel with the axis of the front wheels. Such relative movement will obviously be resisted not only by the pressure of the springs 24, but also by friction, and will be sufficient at all times to cushion the blow against the body of the vehicle and lessen the shock on all the moving operable parts. As soon as the obstruction has been passed the springs 24 will restore the parts to their normal position in an obvious manner.

After a period of use of the vehicle it may be rendered idle and during periods of idleness the nuts or collars 22 may be turned to relieve the springs 24 so as to maintain their life as long as possible.

While I have shown the preferred embodiment of the invention in the accompanying drawings, it will be obvious of course, that such embodiment may be changed and varied in details of construction without departing from the invention as defined in the appended claims.

I claim as my invention:

1. In a tractor or the like, a body bolster, an axle, a yoke carried by the latter and pivotally engaged with the body-bolster to swing on a horizontal axis, the latter being shiftable from its normal position relatively to the body bolster under the influence of shock as the vehicle passes over obstructions and spring-held interengaging means on the bolster and yoke for resisting shifting of said axis and returning it to its normal position.

2. In a tractor or the like, a body bolster, an axle, a yoke carried by the latter and engaged with the latter for pivotal and sliding movement relatively thereto, and means including springs associated with the connection of the bolster and yoke for normally holding the same in a fixed position relatively to each other and returning them to such position when shifted therefrom under the influence of shock due to passage of the vehicle over obstructions.

3. In a tractor or the like, a body bolster, an axle, a yoke carried by the latter and engaged with the latter for pivotal and sliding movement relatively thereto, and means including springs associated with the connection of the bolster and yoke for normally holding the same in a fixed position relatively to each other and returning them to such position when shifted therefrom under the influence of shock due to passage of the vehicle over obstructions, and means for limiting the direction of the relative sliding movement of the yoke and bolster.

4. In a tractor or the like, a body bolster, an axle, a yoke carried by the latter, and having a sliding engagement with the bolster for permitting relative movement thereof in a vertical plane and a relative pivotal movement about a horizontal axis, and interengaging means on said yoke and said bolster including springs adapted to permit free relative pivotal movement of said yoke and bolster but yieldingly and frictionally resisting relative movement thereof in the said vertical plane.

5. In a tractor or the like, a body bolster, an axle, a yoke carried by the latter, and having a sliding engagement with the bolster for permitting relative movement thereof in a vertical plane and a relative pivotal movement about a horizontal axis, and interengaging means on said yoke and said bolster including springs constituting a shiftable pivotal connection therebetween for permitting free relative pivotal movement of said yoke and bolster but yieldingly and frictionally resisting relative movement thereof in the said vertical plane.

6. In a tractor or the like, a body bolster, an axle, a yoke carried by the latter, and having a sliding engagement with the bolster for permitting relative movement thereof in a vertical plane and a relative pivotal movement about a horizontal axis, and interengaging means on said yoke and said bolster including springs constituting a shiftable pivotal connection therebetween for permitting free relative pivotal movement of said yoke and bolster but yieldingly and frictionally resisting relative movement thereof in the said vertical plane, and guide elements associated with the pivotal connecting means for maintaining the pivotal axis in a plane perpendicular to and intersecting the axle midway between its ends.

7. In a tractor or the like, a body bolster, an axle, a yoke carried by the latter, and having a sliding engagement with the bolster for permitting relative movement thereof in a vertical plane and a relative pivotal movement about a horizontal axis, a pair of sleeves projecting from the front and rear faces of the bolster, a pair of convex projections extending from opposite faces of the yoke and into said sleeves, and a pair of spring-held plungers reciprocable in said sleeves and presenting concave faces engaging the convex projections and coacting therewith to provide a shiftable pivotal axis on which said yoke may turn relatively to said bolster.

LOUIS G. E. BUEHLER.